United States Patent
Nurminen et al.

(10) Patent No.: US 11,032,727 B2
(45) Date of Patent: Jun. 8, 2021

(54) MAXIMUM TIME FOR UNLICENSED SECONDARY CELL DETECTION, MEASUREMENTS AND ACTIVATION IN LICENSED ASSISTED ACCESS

(71) Applicant: NOKIA TECHNOLOGIES OY, Espoo (FI)

(72) Inventors: Riikka Nurminen, Helsinki (FI); Lars Dalsgaard, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 320 days.

(21) Appl. No.: 16/088,194

(22) PCT Filed: Nov. 23, 2016

(86) PCT No.: PCT/FI2016/050822
§ 371 (c)(1),
(2) Date: Sep. 25, 2018

(87) PCT Pub. No.: WO2017/194826
PCT Pub. Date: Nov. 16, 2017

(65) Prior Publication Data
US 2020/0305013 A1    Sep. 24, 2020

Related U.S. Application Data

(60) Provisional application No. 62/336,081, filed on May 13, 2016.

(51) Int. Cl.
*H04B 7/06* (2006.01)
*H04B 17/24* (2015.01)
(Continued)

(52) U.S. Cl.
CPC .......... *H04W 24/10* (2013.01); *H04B 7/0626* (2013.01); *H04B 17/24* (2015.01);
(Continued)

(58) Field of Classification Search
CPC .......... H04B 7/0626; H04B 17/20–382; H04L 5/00–0098; H04J 11/0069–0093;
(Continued)

(56) References Cited

U.S. PATENT DOCUMENTS 6,990,318 B2    1/2006  Horisaki
8,804,536 B2    8/2014  Barbieri et al.
(Continued)

FOREIGN PATENT DOCUMENTS

WO    WO-2015018025 A1 *   2/2015
WO    2015167232 A1       11/2019

OTHER PUBLICATIONS

CMCC, 3GPP TSG RAN WG2 #91, R2-153217, Aug. 24 to Aug. 28, 2015, Beijing, China, "RSSI Measurements and Reporting", 8 pages, XP05104213, retrieved from the Internet: URL http://www.3gpp.org/ftp/Meetings_3GPP_SYNC/RAN2/Docs/ [retrieved on Aug. 23, 2015]. (Year: 2015)*

(Continued)

*Primary Examiner* — Timothy J Weidner
(74) *Attorney, Agent, or Firm* — Squire Patton Boggs (US) LLP

(57) ABSTRACT

Appropriate timing may beneficial in various communication systems. For example, Long Term Evolution Advanced (LTE-A) and LTE Licensed Assisted Access (LAA) may benefit from appropriate maximum time determinations for unlicensed secondary cell (SCell) detection, measurements, and activation. A method can include determining a window for a reference signal. The method can also include communicating based on the determined window. For example, the method can include transmitting the reference signal based on the determined window. Alternatively, or in addition, the method can include providing measurement reports based on the reference signal received within the window.

18 Claims, 8 Drawing Sheets

(51) Int. Cl.

| | |
|---|---|
| *H04B 17/26* | (2015.01) |
| *H04J 11/00* | (2006.01) |
| *H04L 5/00* | (2006.01) |
| *H04W 16/14* | (2009.01) |
| *H04W 24/10* | (2009.01) |
| *H04W 48/16* | (2009.01) |
| *H04W 56/00* | (2009.01) |
| *H04W 72/04* | (2009.01) |
| *H04W 76/11* | (2018.01) |
| *H04W 76/15* | (2018.01) |
| *H04W 84/04* | (2009.01) |
| *H04W 84/12* | (2009.01) |
| *H04W 88/06* | (2009.01) |
| *H04W 88/10* | (2009.01) |
| *H04W 92/10* | (2009.01) |

(52) U.S. Cl.
CPC .......... *H04B 17/26* (2015.01); *H04J 11/0073* (2013.01); *H04J 11/0076* (2013.01); *H04J 11/0079* (2013.01); *H04J 11/0083* (2013.01); *H04J 11/0086* (2013.01); *H04J 11/0093* (2013.01); *H04L 5/001* (2013.01); *H04L 5/005* (2013.01); *H04L 5/0007* (2013.01); *H04L 5/0048* (2013.01); *H04L 5/0051* (2013.01); *H04L 5/0098* (2013.01); *H04W 16/14* (2013.01); *H04W 48/16* (2013.01); *H04W 56/001* (2013.01); *H04W 72/042* (2013.01); *H04W 72/0406* (2013.01); *H04W 76/11* (2018.02); *H04W 76/15* (2018.02); *H04W 84/04* (2013.01); *H04W 84/12* (2013.01); *H04W 88/06* (2013.01); *H04W 88/10* (2013.01); *H04W 92/10* (2013.01)

(58) Field of Classification Search
CPC ..... H04J 2011/0096; H04W 16/14–16; H04W 24/02–10; H04W 48/02–20; H04W 56/001–0025; H04W 72/04–10; H04W 74/002–0891; H04W 76/10–19; H04W 84/02; H04W 84/04–047; H04W 84/10–12; H04W 88/02; H04W 88/04–10; H04W 92/02–04; H04W 92/10
See application file for complete search history.

(56) References Cited

U.S. PATENT DOCUMENTS

| | | | |
|---|---|---|---|
| 2014/0335850 A1 | 11/2014 | Ko et al. | |
| 2016/0073366 A1* | 3/2016 | Ng et al. | ............... H04W 16/14 |
| 2016/0127098 A1 | 5/2016 | Ng et al. | |
| 2016/0157116 A1* | 6/2016 | Zhang et al. | ......... H04W 24/10 |
| 2016/0227428 A1 | 8/2016 | Novlan et al. | |

OTHER PUBLICATIONS

International Search Report & Written Opinion dated Feb. 23, 2017 corresponding to International Patent Application No. PCT/FI2016/050822.

Huawei et al., "Further discussion on SCell activation delay in LAA", 3GPP Draft; R4-160825 Further Discussion on Scell Activation Delay in LAA, 3rd Generation Partnership Project (3GPP), Mobile Competence Centre ; 650, Route Des Lucioles; F-06921 Sophia-Antipolis Cede, vol. RAN WG4, No. St. Julian's, Malta; Feb. 6, 2016.

Intel Corporation: "Further consideration on LAA measurement requirements" 3GPP Draft; R4-161651 LAA Side Condition R1, 3rd Generation Partnership Project (3GPP), Mobile Competence Centre; 650 , Route Des Lucioles; F-06921 Sophia-Antipolis Cedex; France , vol. RAN WG4, No. San Jose Del Cabo, Mexico; Apr. 1, 2016.

Nokia: "On LAA Cell Detection and Measurements", 3GPP Draft; R4-163451 on LAA Cell Detection and Measurements, 3rd Generation Partnership Project (3GPP), Mobile Competence Centre; 650, Route Des Lucioles; F-06921 Sophia-Antipolis Cedex; France, vol. RAN WG4, No. Nanjing, China; May 22, 2016.

Nov. 27, 2019 Extended Search Report issued in European Patent Application No. 16901565.8.

European Office Action issued in corresponding European Patent Application No. 16 901 565.8-1205 dated Jan. 25, 2021.

CMCC, 3GPP TSG RAN WG2 #91, R2-153217, Aug. 24 to Aug. 28, 2015, Beijing, China, "RSSI Measurements and Reporting", 8 pages, XP051040213, retrieved from the Internet: URL http://www.3gpp.org/ftp/Meetings_3GPP_SYNC/RAN2/Docs/ [retrieved on Aug. 23, 2015].

Australian Office Action issued in corresponding Australian Patent Application No. 2016406379 dated Jan. 25, 2021.

* cited by examiner

Cell detection requirements:

Table 8.11.2.1.1.1-1: Intra-frequency cell detection under operation with frame structure 3

| SCH Ês/Iot | $T_{detect\_intra\_FS3}$ [ms] |
|---|---|
| [0] ≤ SCH Ês/Iot | ([1]+L) * $T_{DMTC\_periodicity}$ |
| [-6] ≤ SCH Ês/Iot < [0] | ([4]+L) * $T_{DMTC\_periodicity}$ |

Measurement requirements:

Table 8.11.2.1.1.1-2: Intra-frequency measurement requirements under operation with frame structure 3

| Measurement bandwidth [RB] | CRS Ês/Iot | Discovery signal occasion duration (ds-OccasionDuration) [ms] | $T_{measure\_intra\_FS3\_CRS}$ [ms] |
|---|---|---|---|
| ≥6 | [0] ≤ CRS Ês/Iot | 1 | ([3]+M) * $T_{DMTC\_periodicity}$ |
| ≥6 | [-6] ≤ CRS Ês/Iot < [0] | 1 | ([5]+M) * $T_{DMTC\_periodicity}$ |
| ≥25 | [0] ≤ CRS Ês/Iot | 1 | ([1]+M) * $T_{DMTC\_periodicity}$ |
| ≥25 | [-6] ≤ CRS Ês/Iot < [0] | 1 | ([3]+M) * $T_{DMTC\_periodicity}$ |

Figure 1

MAXIMUM TIME FOR UNLICENSED SECONDARY CELL DETECTION, MEASUREMENTS AND ACTIVATION IN LICENSED ASSISTED ACCESS

CROSS-REFERENCE TO RELATED APPLICATION

This application is related to and claims the benefit and priority of U.S. Provisional Patent Application No. 62/336,081, filed May 13, 2016, the entirety of which is hereby incorporated herein by reference.

BACKGROUND

Field

Appropriate timing may be beneficial in various communication systems. For example, Long Term Evolution Advanced (LTE-A) and LTE licensed assisted access (LAA) may benefit from appropriate maximum time determinations for unlicensed secondary cell (SCell) detection, measurements, and activation.

Description of the Related Art

Secondary Cell (SCell) Activation procedures and requirements are an aspect of the LTE-Advanced system, and especially licensed assisted access. In that system, when a given SCell is located on an unlicensed carrier, it may be subject to listen-before-talk (LBT) procedures.

In some regions in the world, unlicensed technologies need to abide to certain regulations, such as listen-before-talk in order to provide fair coexistence between LTE and other technologies such as Wi-Fi, as well as between LTE operators.

In LTE-LAA, before being permitted to transmit, a user equipment or an access point, such as an evolved Node B (eNodeB or eNB) may, depending on the regulatory requirements, need to sense the given radio frequency for a short period of time to ensure the spectrum is not already occupied by some other transmission. This requirement can be referred to as listen-before-talk or clear channel assessment (CCA). The requirements for LBT vary depending on the geographic region: in the US, for example, such requirements do not exist, whereas in Europe and Japan the network elements operating on unlicensed bands need to comply with LBT requirements. Moreover, LBT might be needed in order to guarantee co-existence with other unlicensed band usage in order to enable, for example, fair co-existence with Wi-Fi also operating on the same spectrum.

Unnecessary transmissions on unlicensed carriers may need to be minimized in order to avoid interfering with other devices or access points operating on the same carrier frequency or preventing such devices from accessing the channel due to LBT requirements/operation. Furthermore, LBT requirements may imply that the eNodeBs and UEs operating on an unlicensed carrier may need to stop transmission from time to time to monitor whether the channel is available. In case the channel is sensed as free according to LBT rules the eNodeB or UE may resume transmission. If the channel is sensed as occupied, the eNodeB or UE may not be able to access the channel and may need to suspend transmission until the channel is sensed as unoccupied according to LBT rules.

Radio resource management (RRM) measurements, cell detection and SCell activation in LAA are done based on discovery reference signals (DRS). LAA DRS are made up of the 12 first symbols of LTE Release 12 DRS. LTE DRS contains a primary synchronization signal (PSS), secondary synchronization signal (SSS), cell-specific reference signal (CRS), and optionally channel state information reference signal (CSI-RS) symbols. DRS is transmitted within a 6 ms discovery measurement timing configuration (DMTC) period, which occurs with a periodicity once every 40, 80 or 160 ms. In LAA, UE is restricted to measure reference signal received power (RSRP) and reference signal received quality (RSRQ) during DMTC, because only within DMTC can the US assume constant CRS power.

In Release 12 LTE, DRS position within the DMTC is fixed between different DMTCs, which means that once the position has been detected, the UE knows that in the following DMTC the DRS will occur at the same position, namely exactly 40, 80 or 160 ms later. Additionally DRS was introduced for licensed band where LBT is not applicable. Thus, the presence of PSS, SSS and RS is guaranteed in each DRS. In LAA by contrast, DRS can be located in any of the subframes within the DMTC, and the position of the DRS between different DMTCs is not fixed. In LAA, LBT may additionally block eNodeB from transmitting DRS within the whole DMTC, so DRS may not be available at all. Therefore, the UE needs to search for the DRS within each DMTC.

Cell detection, RRM measurements and SCell activation requirements in LAA are based on DMTC occasions. Because LBT may prevent eNodeB from transmitting DRS when the channel is occupied, DRS may not be present in some DMTC occasions. For this reason LBT impact is taken into account in all requirements by allowing a longer time for the UE in case DRS cannot be transmitted from the eNB side (i.e. DRS is not present on UE side). The time allowed for the aforementioned procedures is extended by one DMTC period each time LBT blocks the eNB transmission within a whole DMTC.

FIG. 1 illustrates requirements in 3GPP TS 36.133. In FIG. 1, L is the number of configured discovery signal occasions which are not available during $T_{detect\_intra\_FS3}$ for cell detection at the UE due to the absence of the necessary radio signals. Moreover, M is the number of configured discovery signal occasions which are not available during $T_{measure\_intra\_FS3\_CRS}$ for the measurements at the UE due to the absence of the necessary radio signals.

SCell activation delay can be defined for a known SCell as follows: $T_{activate\_basic\_FS3}=16$ ms$+T_{DMTC\_duration}+(L+2)*T_{DMTC\_periodicity}$. Similarly, SCell activation delay can be defined for an unknown SCell as follows: $T_{activate\_basic\_FS3}=16$ ms$+T_{DMTC\_duration}+(L+3)*T_{DMTC\_periodicity}$. In these definitions $T_{DMTC\_duration}=6$ ms is the DMTC duration, $T_{DMTC\_periodicity}$ is the periodicity of the DMTC, and L is the number of times the discovery signal occasion is not available at the UE during the SCell activation time.

FIG. 2 illustrates a scenario in which LBT blocks transmission for a long time period. Because of the requirements discussed above, LBT may block the eNodeB from transmitting DRS for a long period of time as shown in FIG. 2. In this case, DRS occasions used for cell detection, measurements or activation may spread to a very long time period. The current proposals do not have any time limits defined. In such case, it may happen that some collected samples may get too old to be reliable before more samples can be collected, and averaging can finally be done. In FIG. 2, where 5 DRS are to be sampled, samples from $1^{st}$ and $2^{nd}$ DRS could, depending on multiple factors, such as channel model, UE speed, or the like, be too old when the $3^{rd}$, $4^{th}$ and $5^{th}$ DRS are available for measurements.

SUMMARY

A method can include determining a window for a reference signal. The method can also include communicating based on the determined window.

For example, according to a first embodiment, the method can include transmitting the reference signal based on the determined window.

In a variant, the reference signal can be or include a discovery reference signal.

In a variant, the reference signal can include at least one of a primary synchronization signal, a secondary synchronization signal, a cell-specific reference signal, or a channel state information reference signal.

In a variant the window can be or include a maximum time for at least one of licensed assisted access secondary cell detection, measurement, or activation.

In a variant, the window can include a fixed window having a predetermined time duration.

In a variant, the window can include a sliding window having a predetermined sliding time duration.

In a variant, the window can be a flexible or configurable time period.

In a variant, the method can include configuring a user equipment with the window.

In a variant, the window can include a maximum suppression ratio having a predetermined occurrence set.

According to a second embodiment, the method can include performing measurements, providing measurement reports, or both performing measurements and providing measurement reports, based on the reference signal received within the window. The second embodiment may be used with the first embodiment.

In a variant, the method can include receiving a configuration of the window.

In a variant, the method can further include configuring the window based on received configuration.

The second embodiment can also include any of the variants of the first embodiment.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein:

FIG. 1 illustrates requirements in 3GPP TS 36.133.

DETAILED DESCRIPTION

Certain embodiments provide mechanisms and approaches for determining a maximum time for LAA SCell detection, measurements and activation under the impact of, for example, the eNodeB LBT feature. Such a maximum time may avoid a situation in which there is no time limit, and the results discussed above.

For example, certain embodiments may guarantee that DRS occasions, which are used for detecting, measuring or activating a LAA SCell, occur within a time that is short enough to guarantee reliability of all averaged samples in time, but at the same time long enough to make UE operation not too difficult.

The following discussion provides a few possible alternatives of how to determine a maximum time for LAA SCell detection, measurements and activation.

Figure 2:
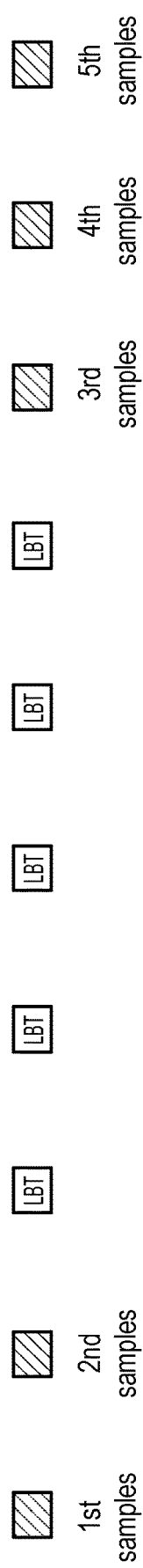
FIG. 2 illustrates a scenario in which LBT blocks transmission for a long time period.
Figure 3:
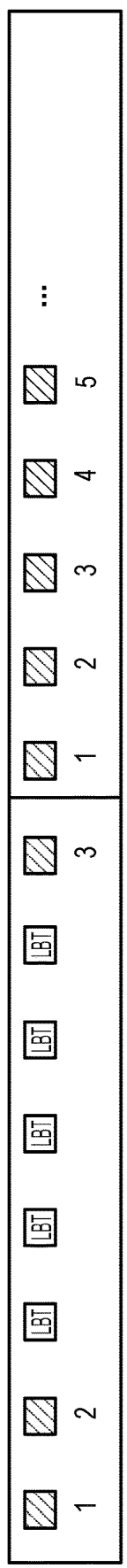
FIG. 3 illustrates a fixed window according to certain embodiments.

FIG. 3 illustrates a fixed window according to certain embodiments. As shown in FIG. 3, according to a first option a fixed window can be defined. The fixed window can be a window within which the used DRS should occur. In this example, the object may be to obtain five DRS measurements. In such a case, counting the five desired DRS can start over when the time window expires. This may fail to make use of certain measurements including both stale measurements (measurements #1 and #2 in the left window) and more recent measurements (measurement #3 in the left window).

Figure 4:
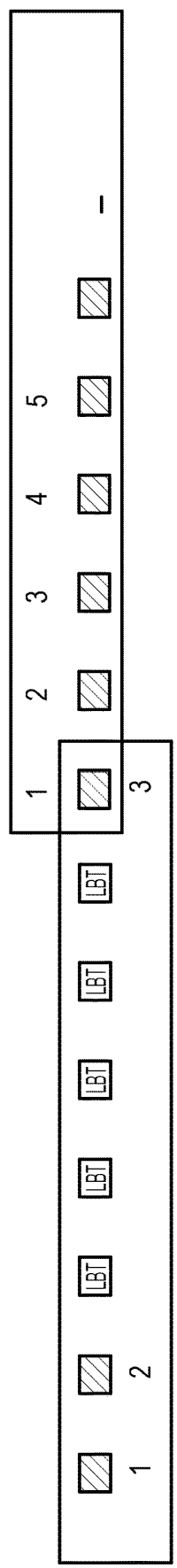
FIG. 4 illustrates a sliding window according to certain embodiments.

FIG. 4 illustrates a sliding window according to certain embodiments. As shown in FIG. 4, according to a second option a sliding window can be defined. The sliding window can be a window within which the used DRS should occur. In a case where the object is to obtain five DRS measurements, the five desired DRS may need to occur within a specified time window, but the window can be sliding rather than fixed.

In this case, because of the sliding window measurement #3 in the left window can be taken into account in the sliding window, rather than remaining unused. This may potentially permit reporting to take place sooner than in the fixed window scenario, but may require more complexity to keep track of the sliding window.

According to a third option, a window can be provided by a maximum suppression ratio, according to certain embodiments. For example, a window can be defined such that within a given number of potential DRS occurrence locations there would need to be a minimum number of positive DRS transmissions. At least in those cases, DRS may not be subject to LBT on the eNB side. An alternative is to use a DMTC definition, such that within a number of DMTC there would need to be a minimum number of non-LBT DMTC occurrences. This can be referred to as a maximum suppression ratio, since LBT may be used to suppress only so many DRS transmissions or DMTC occurrences.

The above options can be variously implemented. For example, there are at least three ways to implement a fixed window. According to a first approach, if L or M, the amount of times LBT prevents eNodeB from transmitting DRS within a DMTC, is larger than value X, the UE can start the detection/measurement/activation procedure over.

According to a second approach, if L or M is higher than a given threshold Y within a period, the UE may be allowed to re-initiate a cell detection/measurement procedure.

According to a third approach, if the desired amount of DRS cannot be received within a fixed time Z, the UE can start the detection/measurement/activation procedure over. In one alternative, for example, if a UE should obtain five DRS within ten opportunities, then the UE can restart the detection/measurement/activation procedure after encountering six missed opportunities within the window, even if those were the first six opportunities of the fixed window.

Similarly, there may be at least two ways to implement a sliding window. According to a first approach available discovery signal occasions used for cell detection/measurement/activation should occur within X seconds or Y DMTC periods. X and Y are different than in other examples.

According to a second approach, if L or M is higher than a given threshold X within any given time period, the UE is allowed to re-initiate a cell detection/measurement procedure. This may be a different X, once again.

In any of the approaches to fixed or sliding windows, the time period of the window could be flexible and configurable. The time period and threshold X may depend on the UE implementation and could, for example, be exchangeable information between UE and network. Additionally the different parameters—period and X—may be deployment dependent and could be configurable parameters.

The UE can collect and store samples from available DRS occasions and keeps track of how old the samples are. The window can be sliding as shown in the FIG. 5. After beginning the measurement/identification/activation procedure, the UE basically searches a time period, within which a desired amount of DRS are available. This can result in the sliding window being a series of overlapping windows.

Figure 5:
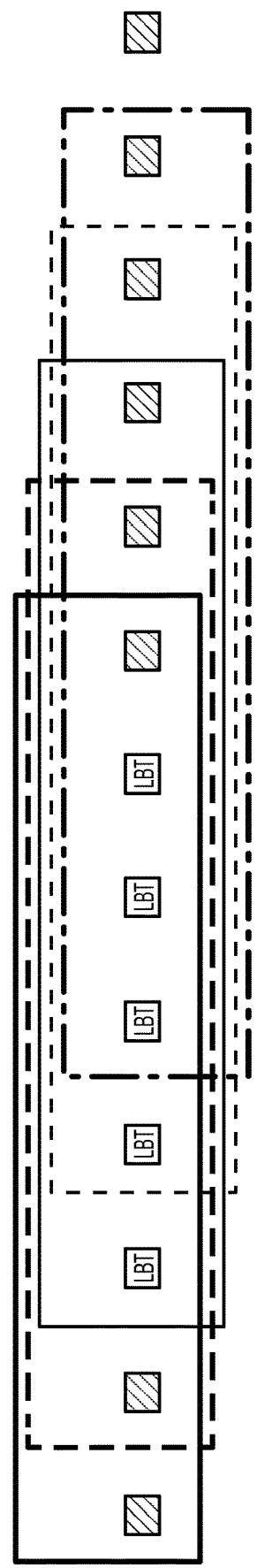
FIG. 5 illustrates various steps of a sliding window, according to certain embodiments.

FIG. 5 illustrates various steps of a sliding window, according to certain embodiments. For example, when the desired amount of DRS is 5, the right-most window in FIG. 4 is the first one that has 5 DRS available after starting the measurement. The UE can, for example, average over samples from these DRS.

The difference between the sliding window approaches is that in the first approach the window length is defined in seconds, for example 5 seconds, or DMTC periods, for example 40 DMTC periods, without any other restrictions. In the second approach the window is of certain length, which can be defined in seconds or DMTC periods, but there can be an extra restriction that LBT may block the DRS transmission in DMTC only a certain amount of times. This restriction can be clarified to consider only the time between the first and last DRS occasion used for cell identification, measurements or activation. This would not rule out a situation where desired amount of available DRS occur at the beginning of the window, and after that there would be too many empty DMTC occasions, where LBT has blocked DRS transmission.

As noted above, another option is to define window in terms of a maximum suppression ratio. For example, it can be defined that within a given number of potential DRS occurrence locations there would need to be a minimum number of positive DRS transmissions.

This value can be defined as numerical value, such as four positive DMTC out of eight possible DMTC occurrences. Alternatively, this could be defined as a percentage, for example, 50% successful DMTC over a given time window. Similarly, this could be defined as relative, for example, five out of ten possible DMTC would need to be successful. Other alternatives are also possible.

In addition to any of the above, a maximum gap between two DRS occasions can be defined. In such embodiments it can be additionally defined that there is a condition that the time between two consecutive DRS should be less than X seconds within the defined time window. Once again, this is a different X than discussed above.

Figure 6:
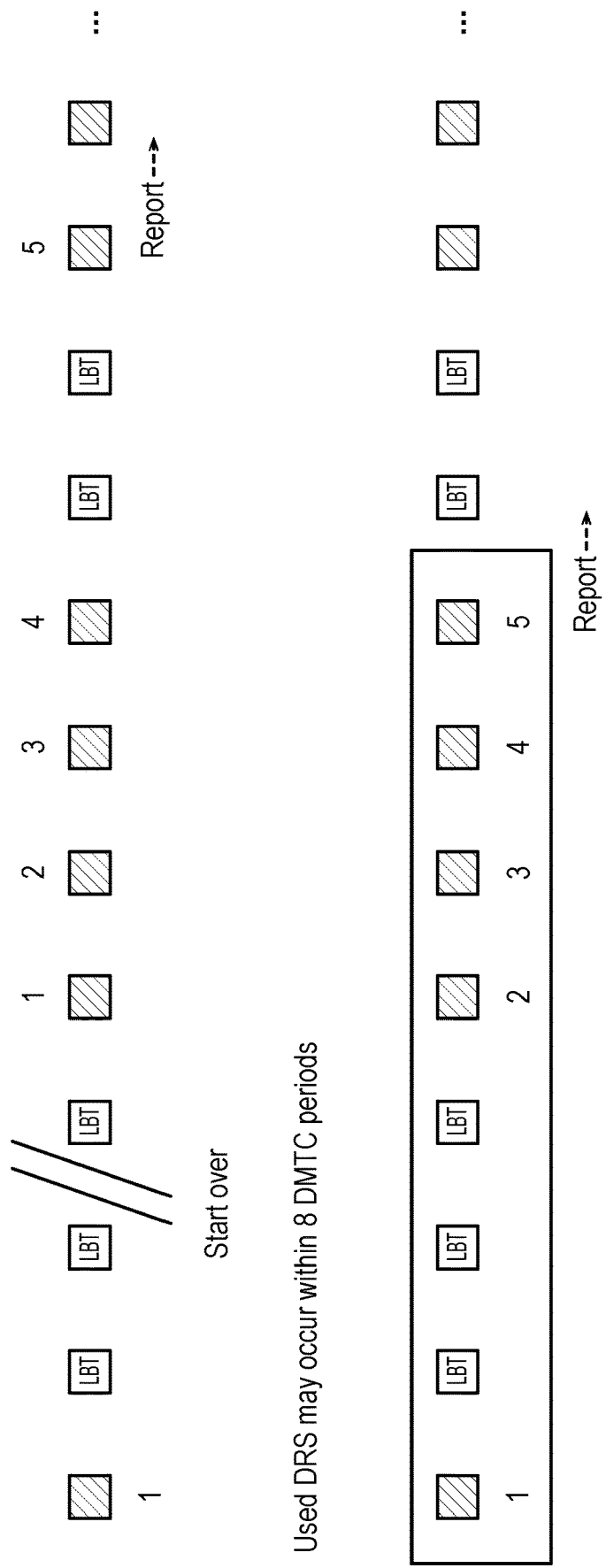
FIG. 6 illustrates a difference between a maximum time between two DRS being defined and a window within which DRS should occur being defined.

FIG. 6 illustrates a difference between a maximum time between two DRS being defined (top portion of figure) and a window within which DRS should occur being defined (bottom portion of figure).

Figure 7:
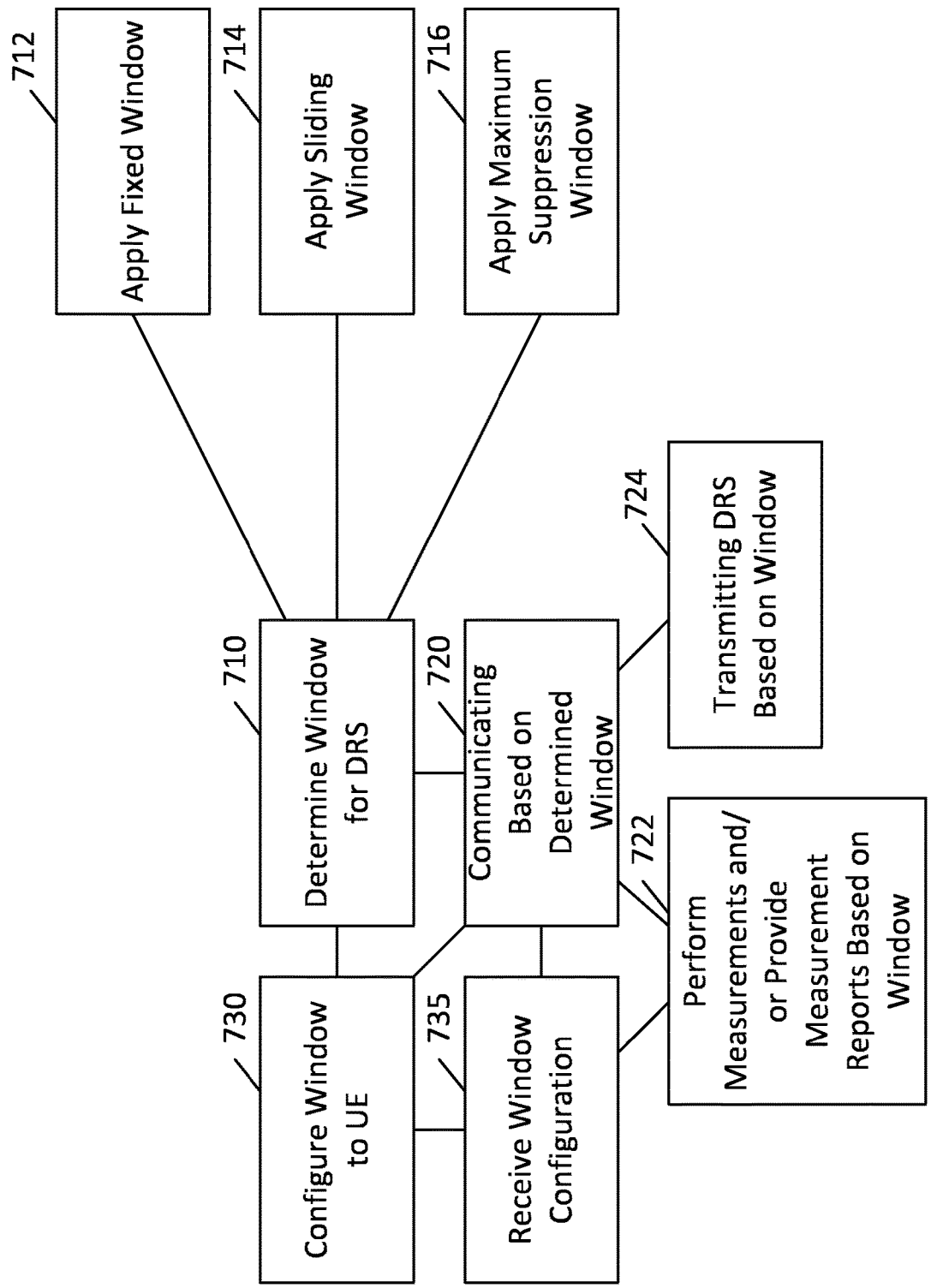
FIG. 7 illustrates a method according to certain embodiments.

FIG. 7 illustrates a method according to certain embodiments. As shown in FIG. 7, a method can include, at 710, determining a window for a reference signal. The method can also include, at 720, communicating based on the determined window.

For example, according to certain embodiments, the method can include, at 724, transmitting the reference signal based on the determined window. The reference signal can be a discovery reference signal. For example, the reference signal can include at least one of a primary synchronization signal, a secondary synchronization signal, a cell-specific reference signal, or a channel state information reference signal.

The window can be a maximum time for at least one of licensed assisted access secondary cell detection, measurement, or activation. Other time-limited processes are also permitted.

The window can be a fixed window having a predetermined time duration, applied at 712. Alternatively, the window can be a sliding window having a predetermined sliding time duration, applied at 714. The window can, in either fixed or sliding form, be a flexible or configurable time period. Thus, at 730, the method can include configuring a user equipment with the window. This configuration can be received by the user equipment at 735.

Alternatively, or in addition, the window can include a maximum suppression ratio having a predetermined occurrence set, as described above and applied at 716. Various options for implementing any of the window types are described above. The described and similar variations are permitted.

According to certain embodiments, the method can include, at 722, performing measurement and/or providing measurement reports based on the reference signal received within the window. Performing measurements and providing measurement reports are two examples of processes that can be performed based on using the window. Other processes are also permitted. The measurement reports can be provided back to an access node, such as an eNB. Thus, this method may be implemented, for example, in a system including at least one user equipment and at least one other network element, but optionally many network elements.

Figure 8:
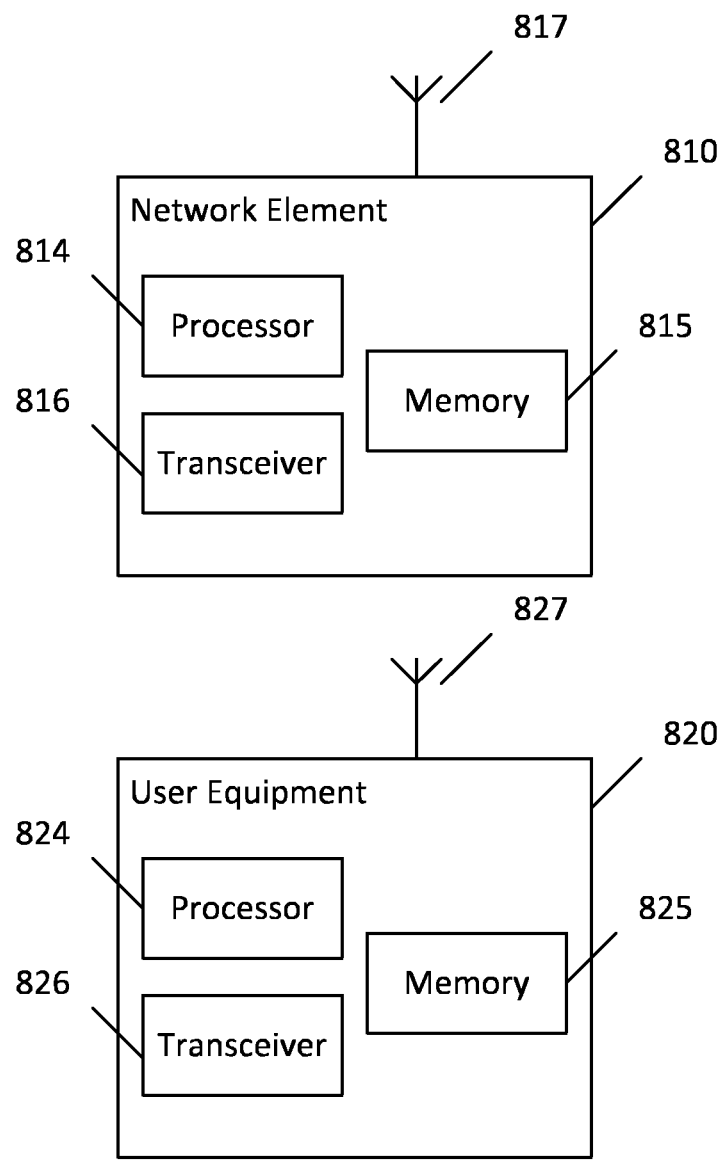
FIG. 8 illustrates a system according to certain embodiments.

FIG. 8 illustrates a system according to certain embodiments of the invention. It should be understood that each block of the flowchart of FIG. 7 may be implemented by various means or their combinations, such as hardware, software, firmware, one or more processors and/or circuitry. In one embodiment, a system may include several devices, such as, for example, network element 810 and user equipment (UE) or user device 820. The system may include more than one UE 820 and more than one network element 810, although only one of each is shown for the purposes of illustration. A network element can be an access point, a base station, an eNode B (eNB), or any other network element. Each of these devices may include at least one processor or control unit or module, respectively indicated as 814 and 824. At least one memory may be provided in each device, and indicated as 815 and 825, respectively. The memory may include computer program instructions or computer code contained therein, for example for carrying out the embodiments described above. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, network element 810 and UE 820 may be additionally configured for wired communication, in addition to wireless communication, and in such a case antennas 817 and 827 may illustrate any form of communication hardware, without being limited to merely an antenna.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 820 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, vehicle, pocket video camera, navigation unit provided with wireless communication capabilities or any combinations thereof. The user device or user equipment 820 may be a sensor or smart meter, or other device that may usually be configured for a single location.

In an exemplifying embodiment, an apparatus, such as a node or user device, may include means for carrying out embodiments described above in relation to FIG. 7.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 810 and/or UE 820, to perform any of the processes described above (see, for example, FIG. 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 8 illustrates a system including a network element 810 and a UE 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

3GPP Third Generation Partnership Project
ACK Acknowledgement
CA Carrier Aggregation
CC Component Carrier DL Downlink
eNB Evolved NodeB
ETSI European Telecommunications Standards Institute
FDD Frequency Division Duplex
HARQ Hybrid Automatic Repeat Request
LAA Licensed Assisted Access
LBT Listen-Before-Talk
LTE Long Term Evolution
PCell Primary cell
PDCCH Physical Downlink Control Channel
PUCCH Physical Uplink Control Channel
SCell Secondary cell (operating on un-licensed carrier in this IR)
TDD Time Division Duplex
UE UE Equipment
UL Uplink
PSS Primary Synchronization Signal
SSS Secondary Synchronization Signal
CRS Cell-specific Reference Signal
DRS Discovery Reference Signal
DMTC Discovery Measurement Timing configuration

The invention claimed is:

1. An apparatus, comprising:
at least one processor; and
at least one memory including computer program code,
wherein the at least one memory and the computer program code are configured to, with the at least one processor, cause the apparatus at least to perform:
determining a window for a reference signal; and
communicating based on the determined window,
wherein the window comprises a maximum time for at least one of licensed assisted access secondary cell detection, cell identification, measurement, or activation,
wherein the window comprises a sliding window having a predetermined sliding time duration, and
wherein a number of times reference signal transmissions are blocked within the predetermined sliding time duration is lower than a predetermined amount of times.

2. The apparatus of claim 1, wherein the communicating comprises transmitting the reference signal based on the determined window.

3. The apparatus of claim 1, wherein the reference signal comprises at least one of a primary synchronization signal, a secondary synchronization signal, a cell-specific reference signal, or a channel state information reference signal.

4. The apparatus of claim 1, wherein the window comprises a fixed window having a predetermined time duration.

5. The apparatus of claim 1, wherein the window comprises a flexible or configurable time period.

6. The apparatus of claim 1, wherein the at least one memory and the computer program code are further configured to, with the at least one processor, cause the apparatus to:
configure a user equipment with the window.

7. An apparatus, comprising:
at least one processor; and
at least one memory including computer program code,
wherein the at least one memory and the computer program code are configured to, with the at least one processor, cause the apparatus at least to perform:
receiving a reference signal within a window; and
performing measurements, provide measurement reports, or both perform measurements and provide measurement reports, based on the reference signal received within the window,
wherein the window comprises a maximum time for at least one of licensed assisted access secondary cell detection, cell identification, measurement, or activation,
wherein the window comprises a sliding window having a predetermined sliding time duration, and
wherein a number of times reference signal transmissions are blocked within the predetermined sliding time duration is lower than a predetermined amount of times.

8. The apparatus of claim 7, wherein the at least one memory and the computer program code are further configured to, with the at least one processor, cause the apparatus to:
receive a configuration of the window.

9. The apparatus of claim 8, wherein the at least one memory and the computer program code are further configured to, with the at least one processor, cause the apparatus to:
configure the window based on received configuration.

10. The apparatus of claim 7, wherein the reference signal comprises a discovery reference signal.

11. The apparatus of claim 7, wherein the reference signal comprises at least one of a primary synchronization signal, a secondary synchronization signal, a cell-specific reference signal, or a channel state information reference signal.

12. The apparatus of claim 7, wherein the window comprises a fixed window having a predetermined time duration.

13. The apparatus of claim 7, wherein the window comprises a flexible or configurable time period.

14. An apparatus, comprising:
at least one processor; and
at least one memory including computer program code,
wherein the at least one memory and the computer program code are configured to, with the at least one processor, cause the apparatus at least to perform:
receiving a reference signal within a window; and
performing measurements, provide measurement reports, or both perform measurements and provide measurement reports, based on the reference signal received within the window,
wherein the window comprises a maximum time for at least one of licensed assisted access secondary cell detection, cell identification, measurement, or activation, and
wherein the window comprises a maximum suppression ratio having a predetermined occurrence set.

15. A method, comprising:
receiving a reference signal within a window; and
performing measurements, providing measurement reports, or both performing measurements and providing measurement reports, based on the reference signal received within the window,
wherein the window comprises a maximum time for at least one of licensed assisted access secondary cell detection, cell identification, measurement, or activation,
wherein the window comprises a sliding window having a predetermined sliding time duration, and
wherein a number of times reference signal transmissions are blocked within the predetermined sliding time duration is lower than a predetermined amount of times.

16. The method of claim 15, further comprising:
receiving a configuration of the window.

17. The method of claim 15, further comprising:
configuring the window based on received configuration.

18. The method of claim 15, wherein the reference signal comprises at least one of a primary synchronization signal, a secondary synchronization signal, a cell-specific reference signal, or a channel state information reference signal.

* * * * *